United States Patent [19]

Larsson

[11] Patent Number: 4,946,485
[45] Date of Patent: Aug. 7, 1990

[54] AIR DRIER TOWER

[75] Inventor: Anders M. Larsson, Helsingborg, Sweden

[73] Assignee: Garphyttan Haldex AB, Landskrona, Sweden

[21] Appl. No.: 420,540

[22] Filed: Oct. 12, 1989

[30] Foreign Application Priority Data

Oct. 18, 1988 [SE] Sweden ............................... 8803715

[51] Int. Cl.$^5$ .............................................. B01D 53/02
[52] U.S. Cl. ......................................... 55/387; 55/316
[58] Field of Search ........................... 55/316, 387, 389

[56] References Cited

U.S. PATENT DOCUMENTS

| | | | |
|---|---|---|---|
| 2,790,512 | 4/1957 | Dow | 55/35 |
| 3,171,726 | 3/1965 | Roney et al. | 55/275 |
| 4,388,086 | 6/1983 | Bauer et al. | 55/75 |
| 4,581,047 | 4/1986 | Larsson | 55/387 |
| 4,816,047 | 3/1989 | Neal | 55/316 |

FOREIGN PATENT DOCUMENTS 2187393 6/1972 France .
82047812 10/1987 Sweden .

Primary Examiner—Bernard Nozick
Attorney, Agent, or Firm—Laurence R. Brown

[57] ABSTRACT

An air drier tower comprises a base part (2), a reservoir (1) attached thereto, and in the reservoir a cartridge (7) containing desiccant (8). The cartridge is composed of two halves (9,10) having circular walls extending into each other to form a winding air path through the desiccant. A spring (11) is arranged between the reservoir and the cartridge in order to exert a bias on one cartridge half and accordingly on the desiccant.

3 Claims, 1 Drawing Sheet

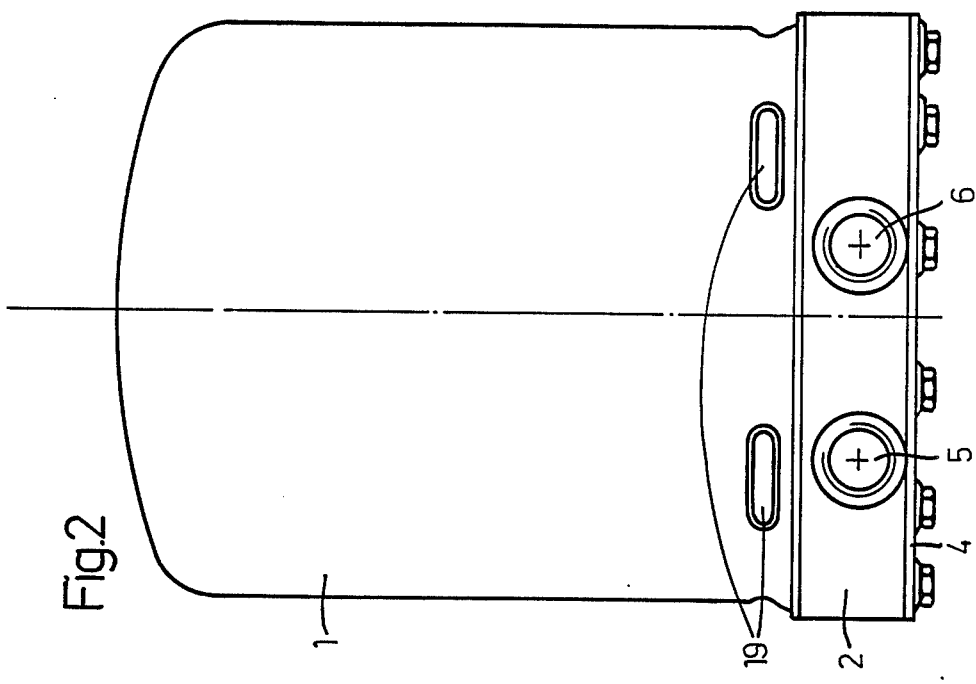
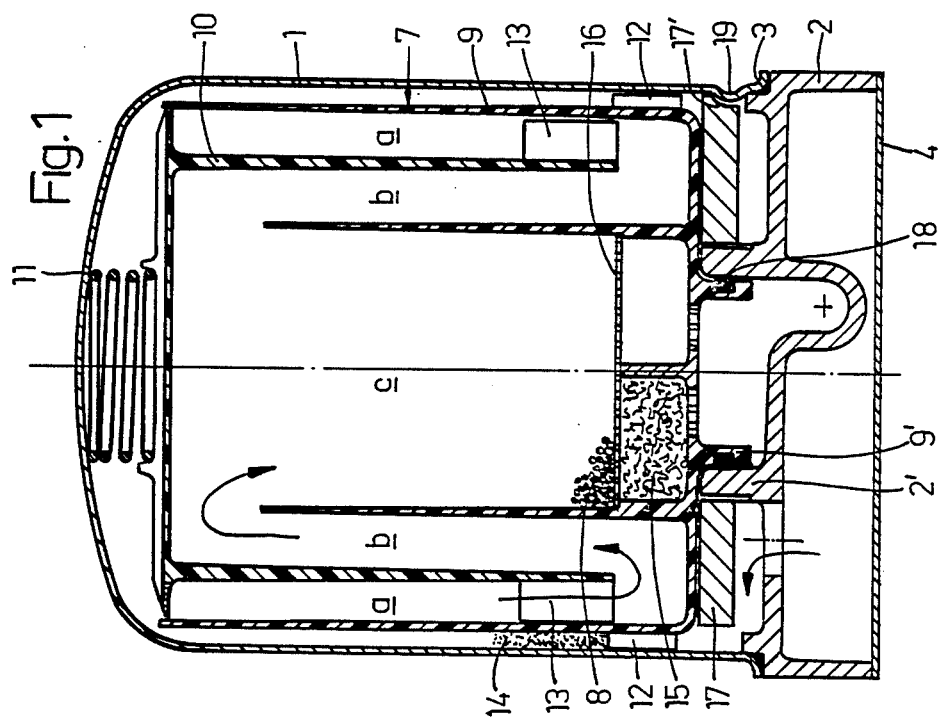

AIR DRIER TOWER

TECHNICAL FIELD

This invention relates to an air drier tower, comprising a base part, a reservoir attached thereto, and in the reservoir a cartridge containing desiccant.

BACKGROUND OF THE INVENTION

Air driers are used both stationary and on vehicles for delivering dry air. As is well known in the art, they can be of the single tower type or of the two tower type. The air drier tower according to the invention can be used for any of these types.

It is known to use a replaceable cartridge containing desiccant in an air drier; in this way the occasional replacement of desiccant in the air drier is greatly facilitated. Such cartridges are supplied as spare parts for earlier delivered air driers Furthermore, it is known (see for example U.S. Pat. No. 2,790,512) that it is advantageous for utilizing the drying function of the desiccant to have a long and comparatively narrow path for the air through the desiccant rather than a short and wide path. The desired long path within a comparatively low tower can be obtained by accomplishing a winding path for the air.

The most favourable drying result is obtained with desiccant granules of a certain uniform size, Mutual movements between these granules may cause disintegration into smaller particles and shall preferably be avoided.

THE INVENTION

An air drier cartridge which fulfils the requirement with regard to both the winding path and the prevention of mutual movements between the desiccant granules if according to the invention attained in that the cartridge is composed of a lower half and an upper half having circular walls extending into each other to form a winding air path through the desiccant, the two halves being spring biased together when mounted in the reservoir.

This spring bias may preferably be obtained by a spring arranged between the reservoir and the cartridge.

In a preferred embodiment the lower cartridge half has two circular walls extending upwards and the upper cartridge half one circular wall extending downwards between the two walls of the lower half, so that a winding air path consisting of three concentric compartments with the same cross-sectional areas are formed.

BRIEF DESCRIPTION OF THE DRAWING

The invention will be described in further detail below reference being made to the accompanying drawing, in which FIG. 1 is a section through an air drier tower according to the invention and FIG. 2 is a side view thereof.

DETAILED DESCRIPTION OF A PREFERRED EMBODIMENT

A drying tower of the kind shown in the drawing can in principle be used for either an air drier of the single tower type or two tower type.

By means to be described below a reservoir 1 is attached to a base part 2. sealing is accomplished by an O-ring 3. A cover 4 is fastened to the base part 2. The base part 2 is provided with an air inlet 5 and an air outlet 6.

A cartridge 7 containing desiccant 8 is arranged in the reservoir 1. It consists of a lower half 9 and an upper half 10, both preferably made of a plastic material. These two halves 9 and 10 are—when placed in position in the reservoir 1—biased into each other by a spring 11 between the upper cartridge half 10 and the reservoir 1. In this way the desiccant 8 in the cartridge 7 is always slightly compressed in an even fashion, which is desired, for preventing undue movements within the desiccant.

The lower cartridge half 9 has two circular walls extending upwards, whereas the upper half 10 has one circular wall extending downwards between said two walls of the lower half. The outer wall of the lower half 9 is provided with guide members 12 cooperating with the reservoir 1, whereas the circular wall of the upper cartridge half 10 is provided with guide members 13 cooperating with the outer wall of the lower half 9.

A filter 14 may be arranged between the cartridge 7 and the reservoir 1, whereas a further filter 15 may be arranged in the bottom of the lower cartridge half 9 under a perforated wall 16. Outlet holes are provided in the lower cartridge half 9 under the filter 15.

The base part 2 has a circular flange 2' extending upwards in the drawing. This flange has an external thread cooperating with an internal thread of an attachment ring 17, which is fastened to the lower cartridge half 9. This lower half 9 has a lower circular flange 9' in sealing contact with the base part flange 2' by means of an O-ring 18.

At its lower portion the reservoir 1 is provided with a number of circumferentially distributed impressions 19, whereas the attachment ring 17 has corresponding recesses 17' in order to create a bayonet mount for the reservoir 1.

The moist air entering the base part 2 through the air inlet 5 flows upwards past the cartridge 7 (through the filter 14 ) and enters the cartridge through a ring of holes in the upper wall of the upper cartridge half 10. By the provision of the inner circular walls in the cartridge 7 and proper dimensioning, a winding path for the air through three compartments a, b and c is accomplished, whereby the cross-sectional area is the same all the time giving a uniform flow velocity for the air through the desiccant 8 properly adopted to an optimal moisture take-up by the desiccant. After also having passed through the filter 15 the air—now dried—leaves the cartridge 7 and flows out through the air outlet 6.

The mounting of the device is performed in the following way: The cartridge 7, comprising the two parts 9 and 10 and containing desiccant 8, is threaded in the base part flange 2' by means of the attachment ring 17 fastened to the cartridge 7. The reservoir 1 is pushed over the cartridge and fastened to the base part 2 by means of the bayonet lock provided between the attachment ring 17 and the reservoir 1. The spring 11 will hereby exert a gentle bias on the desiccant 8.

Modifications are possible within the scope of the appended claims.

I claim:

1. An air drier tower, comprising a base part (2), a reservoir (1) attached thereto, and in the reservoir a cartridge (7) containing desiccant (8), the cartridge (7) is composed of a lower half (9) and an upper half (10) having circular walls extending into each other to form a winding air path through the desiccant (8), the two halves being spring biased together and mounted in the reservoir (1).

2. An air drier tower according to claim 1, wherein a single spring (11) is arranged between the reservoir (1) and the cartridge (7).

3. An air drier tower according to claim 1, wherein the lower cartridge half (9) has two circular walls extending upwards and the upper cartridge half (10) one circular wall extending downwards between the two walls of the lower half, so that a winding air path consisting of three concentric compartments (a, b, c) with the same cross-sectional areas are formed.

* * * * *